US006451874B1

(12) United States Patent
Purgett et al.

(10) Patent No.: US 6,451,874 B1
(45) Date of Patent: *Sep. 17, 2002

(54) LIQUID PAVEMENT MARKING COMPOSITIONS

(75) Inventors: Mark D. Purgett, Oakdale, MN (US); David C. May, Hudson, WI (US); Mark D. Zender, White Bear Lake, MN (US); Daniel J. Willie, Minneapolis, MN (US); Thomas R. Borden, Oakdale, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 5 days.

This patent is subject to a terminal disclaimer.

(21) Appl. No.: 09/698,735

(22) Filed: Oct. 27, 2000

Related U.S. Application Data

(63) Continuation of application No. 09/096,923, filed on Jun. 12, 1998, now Pat. No. 6,166,106.
(60) Provisional application No. 60/049,572, filed on Jun. 13, 1997.

(51) Int. Cl.⁷ .................................................. F21V 7/22
(52) U.S. Cl. ..................................................... 523/172
(58) Field of Search ........................................ 523/172

(56) References Cited

U.S. PATENT DOCUMENTS

| | | |
|---|---|---|
| 2,897,732 A | 8/1959 | Shuger |
| 2,897,733 A | 8/1959 | Shuger |
| 3,043,196 A | 7/1962 | Palmquist et al. |
| 3,175,935 A | 3/1965 | Vanstrum |
| 3,252,376 A | 5/1966 | DeVries |
| 3,254,563 A | 6/1966 | DeVries et al. |
| 3,274,888 A | 9/1966 | Vanstrum et al. |
| 3,326,098 A | 6/1967 | Boettler |
| 3,436,359 A | 4/1969 | Hubin et al. |
| 3,486,952 A | 12/1969 | Vanstrum et al. |
| 3,556,637 A | 1/1971 | Palmquist |
| 4,072,403 A | 2/1978 | Eigenmann |
| 4,076,671 A | 2/1978 | Bright |
| 4,088,633 A | 5/1978 | Gurney |
| 4,185,132 A | 1/1980 | Gurney |
| 4,255,468 A | 3/1981 | Olson |
| 4,652,172 A | 3/1987 | Eigenmann |
| 4,705,814 A | 11/1987 | Grigsby, Jr. et al. |
| 4,721,649 A | 1/1988 | Belisle et al. |
| 4,725,494 A | 2/1988 | Belisle et al. |
| 4,732,919 A | 3/1988 | Grigsby, Jr. et al. |
| 4,833,213 A | 5/1989 | Leir et al. |
| 4,906,716 A | 3/1990 | Yang et al. |
| 4,983,458 A | 1/1991 | Dejaiffe |
| 5,013,813 A | 5/1991 | Zimmerman et al. |
| 5,140,090 A | 8/1992 | Champion et al. |
| 5,162,388 A | 11/1992 | Primeaux, II |
| 5,171,818 A | 12/1992 | Wilson |
| 5,266,671 A | 11/1993 | Primeaux, II |
| 5,268,789 A | 12/1993 | Bradshaw |
| 5,270,364 A | 12/1993 | Schwartz et al. |
| 5,317,076 A | 5/1994 | Primeaux, II |
| 5,442,034 A | 8/1995 | Primeaux, II |
| 5,478,596 A | 12/1995 | Gurney |
| 5,480,955 A | 1/1996 | Primeaux, II |
| 5,504,181 A | 4/1996 | Primeaux, II |
| 5,527,853 A | 6/1996 | Landy et al. |
| 5,616,677 A | 4/1997 | Primeaux |

FOREIGN PATENT DOCUMENTS

| | | |
|---|---|---|
| EP | 0 322 671 A2 | 7/1989 |
| EP | 0 667 362 A1 | 8/1995 |
| GB | 2 113 234 A | 8/1983 |
| JP | 7188583 A | 7/1995 |
| WO | WO 97/03814 | 2/1997 |
| WO | WO 97/28471 | 8/1997 |
| WO | WO 98/01237 | 1/1998 |

OTHER PUBLICATIONS

"Standard TEst Method for Measurement of Retroreflective Pavement marking Materials with CEN–Prescribed Geometry Usng a Portable Retroreflectometer", ASTM Designation: E 1710–95, 1–4 (Jul. 1995).

"Standard Test Method for Measurement of Retroreflective Pavement marking Materials with CEN–Prescribed Geometry Using a Portable Retroreflectometer", ASTM Designation: E 1710–95a, 912–915 (Dec. 1995).

"Standard Test Method for Retroreflectance of Horizontal Coatings", ASTM Designation: D 4061–94, 454–460 (Apr. 1994).

D.J. Primeaux II, "Spray Polyurea Versatile High Performance Elastomer for the Polyurethane Industry", presented at the 32nd Annual Polyurethane Technical/Marketing Conference, Oct. 1–4, 1989.

D.J. Primeaux II, "Spray Polyurea Elastomers Offer Performance Advantages", *Modern Pain and Coatings,* 1–6 (Jun. 1991).

D.J. Primeaux II, "100% Solids Aliphatic Spray Polyurea Elasomer Systems", *J. Elastomers Plastics,* 24, 323–336 (Oct. 1992).

T.M. Santosusso et al., "Oligomeric Diamine–Bsed Polyureas for Adhesive Applications", presented at Polyurethanes World Congress, pp. 329–335 (Sep. 24–26, 1991).

K.–F Torges et al., "Cast Polyurea Elastomers: Application Processing and Performance", presented at Utech '94, Paper #42, pp. 1–8 (1994).

*Primary Examiner*—Edward J. Cain
(74) *Attorney, Agent, or Firm*—Carolyn A. Fischer

(57) ABSTRACT

A pavement marking composition, methods of applying, and pavement markings produced therefrom. The composition is a two-part coating composition having an amine component including one or more aspartic ester amines and optionally one or more amine-functional coreactants, an isocyanate component including one or more polyisocyanates, and material selected from the group of fillers, extenders, pigments, and combinations thereof.

10 Claims, No Drawings

LIQUID PAVEMENT MARKING COMPOSITIONS

This is a continuation of application Ser. No. 09/096,923 filed Jun. 12, 1998 now U.S. Pat. No. 6,166,106 that claims the benefit of U.S. Provisional Application No. 60/049,572, filed Jun. 13, 1997.

BACKGROUND OF THE INVENTION

There is a significant need for a liquid pavement marking composition that will provide increased durability and retained reflectivity once applied to a surface and dried or cured. Compositions of this type are typically used on roads, highways, parking lots, and recreational trails, to form stripes, bars and markings for the delineation of lanes, crosswalks, parking spaces, symbols, legends, and the like. They are typically applied by spray coating (i.e., painting) the pavement surface. Preformed pavement marking sheets or tapes have also been used to mark pavement or traffic bearing surfaces.

Pavement marking stripes, or pavement markings of other shapes, may include reflective optical elements adhered to the pavement surface by the use of a binder. Current traffic paint systems typically use conventional 1.5 $n_n$ glass microspheres for retroreflection. The microspheres are typically flood coated onto the wet marking immediately after coating. This provides the paint with improved retroreflectivity and also covers the top surface of the uncured or undried coating with a protective layer of microspheres. This protective layer allows the markings to be exposed to traffic sooner because of the layer of microspheres over the surface, which prevents transfer of the coating to the surface of vehicle tires. This is important for rates of marking application. The time between application and the point where material will no longer transfer to vehicle tires is defined as the "track-free" time. Shorter track-free times increase marking efficiency by reducing or eliminating the need for traffic disruption through such measures as closing lanes or placing traffic control devices to protect such markings.

It would be advantageous to apply markings in a wider range of weather conditions than is possible with existing compositions. There is also a need for marking compositions with improved cure profiles to ensure both substrate wet out and rapid track-free time. Furthermore, improvements are needed to obtain compositions that are substantially free of volatile organic components.

SUMMARY OF THE INVENTION

The present invention provides a pavement marking including a binder having polyurea groups. Conventional liquid pavement marking compositions include alkyd-based binder compositions as described in U.S. Pat. No. 2,897,732 (Shuger), U.S. Pat. No. 2,897,733 (Shuger), and U.S. Pat. No. 3,326,098 (Boettler), and epoxy-based compositions as described in U.S. Pat. No. 4,088,633 (Gurney), U.S. Pat. No. 4,185,132 (Gurney), and U.S. Pat. No. 4,255,468 (Olson). Such conventional compositions are not desirable for at least one of the following reasons: they typically dry too slowly; they need elevated temperatures for reasonable cure times; they contain chemical linkages (e.g., ester linkages) that are susceptible to degradation (as by hydrolysis, for example); and/or they require the use of organic solvents, drying oils, or drying accelerators, which can lead to discoloration.

Numerous other conventional pavement marking compositions have been developed to get faster dry times by using heated application of materials to road surfaces. Also, water-borne coatings based on acrylic latices, as disclosed in U.S. Pat. No. 5,527,853 (Landy et al.), and epoxy resin emulsions, as disclosed in U.S. Pat. No. 4,906,716 (Cummings), have been suggested for use in pavement markings. Such markings do have the advantages of low volatile organic content and one part coating compositions, but they are not yet sufficiently durable for long term road presence and retained reflectivity performance.

U.S. Pat. No. 4,076,671 (Bright) discloses a resinous composition said to be useful for marking trafficable surfaces. The two part acrylate based coating compositions are said to provide a desirable balance of stability and fast cure, but require the use of free monomers and low molecular weight ethylenically unsaturated compounds which have significant vapor pressures. Also, they require the use of peroxide catalysts. U.S. Pat. No. 5,478,596 (Gurney) discloses liquid pavement marking compositions prepared from a two part polyurethane-forming system of a first component having isocyanate-reactive groups (a polyol) and a second component having isocyanate groups.

A need exists for liquid pavement marking compositions that can provide one or more, and preferably all, of the following features: reduced environmental impact through formulations having low volatile organic content; improved balance of coating rheology during application and film formation to promote substrate wet out and fast cure to track-free films; broadened range of weather conditions for coating application; and/or improved marking performance through increased durability and retained reflectivity. To achieve one or more, and preferably all, of these features, the present invention provides a pavement marking including a binder having polyurea groups.

Pavement markings of the present invention preferably include a binder having polyurea groups, wherein the binder is prepared from a coating composition comprising one or more aliphatic secondary amines, one or more polyisocyanates, material selected from the group of fillers, extenders, pigments, and combinations thereof, and reflective elements (e.g., glass beads, etc.). Preferably, the pavement marking has a retained reflectivity of at least about 100 mcd/m$^2$/lux after at least about 2 years in use as longitudinal traffic markings as measured according to ASTM E 1710-95. Preferably, the binder is prepared from a two-part coating composition comprising an amine component comprising one or more aspartic ester amines and optionally one or more amine-functional coreactants, and an isocyanate component comprising one or more polyisocyanates. A traffic bearing surface having thereon such a pavement marking is also provided.

Also provided is a pavement marking that includes a binder having polyurea groups, wherein the binder is prepared from a sprayable, two-part coating composition substantially free of volatile organic components and comprising an amine component comprising one or more aspartic ester amines and an isocyanate component comprising one or more polyisocyanates. At least one of the amine component and/or the isocyanate component further comprises material selected from the group of fillers, extenders, pigments, and combinations thereof. The coating composition has a minimum application temperature of at least about 7° C. and a track-free time of no greater than about 5 minutes. A traffic bearing surface having thereon such a pavement marking, and a pre-formed pavement marking wherein the pavement marking is coated on a substrate that can be applied to a traffic bearing surface are also provided.

The present invention also provides coating compositions. In one embodiment, the coating composition includes one or more aliphatic secondary amines, one or more polyisocyanates, and material selected from the group of fillers, extenders, pigments, and combinations thereof. The coating composition has a minimum application temperature of at least about 7° C., a track-free time of no greater than about 5 minutes, and forms a pavement marking having reflective elements with a retained reflectivity of at least about 100 mcd/m$^2$/lux after at least about 2 years in use as longitudinal traffic markings as measured according to ASTM E 1710-95.

Also provided is a sprayable two-part liquid pavement marking composition comprising an amine component comprising one or more aspartic ester amines and optionally one or more amine-functional coreactants, and an isocyanate component comprising one or more polyisocyanates. The amine component, the isocyanate component, or both further comprise material selected from the group of fillers, extenders, pigments, and combinations thereof. The coating composition is sprayable and has a minimum application temperature of at least about 7° C. and a track-free time of no greater than about 5 minutes. Preferably, the pavement marking composition comprises an amine component comprising one or more aspartic ester amines and optionally one or more amine-functional coreactants, and an isocyanate component comprising one or more polyisocyanates.

Methods of applying such compositions are also provided. For example, a method of marking a traffic bearing surface is provided. This method includes providing an amine component comprising one or more aspartic ester amines and optionally one or more amine-functional coreactants, providing an isocyanate component comprising one or more polyisocyanates, providing material selected from the group of fillers, extenders, pigments, and combinations thereof in either the amine component, the isocyanate component, or both, combining the amine component and the isocyanate component to form a coating composition having a minimum application temperature of at least about 7° C., and a track-free time of no greater than about 5 minutes, spraying the coating composition onto a traffic bearing surface, and applying reflective elements to the composition coated on the traffic bearing surface to form a pavement marking.

Another embodiment includes a method of preparing a pavement marking. This method includes providing an amine component comprising one or more aliphatic secondary amines, providing an isocyanate component comprising one or more polyisocyanates, providing material selected from the group of fillers, extenders, pigments, and combinations thereof in either the amine component, the isocyanate component, or both, combining the amine component and the isocyanate component to form a coating composition having a minimum application temperature of at least about 7° C., and a track-free time of no greater than about 5 minutes, applying the coating composition to a surface, and applying reflective elements to the composition coated on the surface to form a pavement marking having reflective elements with a retained reflectivity of at least about 100 mcd/m$^2$/lux after at least about 2 years.

DETAILED DESCRIPTION OF THE PREFERRED EMBODIMENTS

The pavement marking compositions of the present invention comprise a binder comprising urea groups (—NR—C(O)—NR—). This binder can be prepared from a two-part system that includes an amine component and an isocyanate component. Preferably, the amine component includes primary or secondary amines. More preferably, the amine component includes one or more secondary amines, such as an aspartic ester amine, which is an aliphatic secondary diamine. Most preferably, the amine component includes one or more aspartic ester amines, optionally blended with one or more amine-functional coreactants other than an aspartic ester amine. Preferably, the amine-functional coreactants are polymeric polyamines, and more preferably, substantially polymeric diamines. These amine-functional coreactants are selected to balance the properties of the coating during the curing process and in its final form.

The amine and isocyanate components are chosen such that the resultant pavement marking is generally resistant and durable to environmental and vehicular stresses and has good daytime visibility. Preferably, it also has good nighttime visibility. Durability can be evidenced by good adhesion to a wide variety of substrate surfaces, including concrete, asphalt, and other markings, whether they be markings of the same or different material. It can also be evidenced by good adhesion (often referred to as "anchoring") of reflective elements to the marking, if they are used. As used herein, "durability" can be determined by applying the pavement marking to a road surface that will be exposed to traffic conditions and monitoring the performance of the marking over time. Reflectivity and whiteness can be measured instrumentally in the field and the resistance of the marking to wear and erosion can be subjectively evaluated. Durable markings have continued adhesion to the substrate, good visibility, and, preferably, good reflectivity over an extended length of time.

The pavement markings formed from the composition of the present invention preferably are durable (i.e., have a useful life) for at least about 2 years, more preferably, for at least about 3 years, and most preferably, for at least about 4 years in use as longitudinal traffic markings. If reflective elements are used, the pavement markings have a retained reflectivity of at least about 100 mcd/m$^2$/lux, and more preferably, at least about 150 mcd/m$^2$/lux, throughout their useful life as longitudinal traffic markings. As used herein, "retained reflectivity" is used to describe the effectiveness of maintained retroreflective performance of a pavement marker over its useful life. Retroreflectivity is currently typically measured by a portable instrument in the field at fixed entrance and observation angles, according to ASTM E 1710-95. Recent work (Transportation Research Record 1409 published 1994 by the Transportation Research Board) has shown that the entrance angle at which light is incident and observation angles from which a driver actually views a pavement marking, referred to herein as "approximate driver geometries," are appropriate for measured retroreflective performance of pavement markings.

The amine and isocyanate components are preferably chosen such that the resultant pavement marking composition: (1) is a liquid with a high solids content, which is substantially free of volatile organic components (preferably, less than about 5 wt-% volatile organic components, typically solvents, based on the total weight of the composition); (2) has a generally rapid cure profile, with a track-free time (i.e., a dry time at ambient roadway conditions when the coating is applied) of preferably, no greater than about 5 minutes, more preferably, no greater than about 4 minutes, and most preferably, no greater than about 3 minutes), and a useful open time (i.e., the length of time the composition will remain in a liquid state after application to a surface) for adequate substrate wet out and particle or reflective element wicking/anchorage (preferably, an open time of at least about 30 seconds, and more preferably, at least about 1 minute); (3) has a broad application window (i.e., it is able to be applied over a wide range of temperatures), with emphasis on use at lower temperatures (preferably, having a minimum application temperature of at least about 7° C., more preferably, at least about 4° C., even more preferably, at least about 2° C., and most preferably, at least about −4° C.); (4) is compatible with two part static mix or airless high pressure impingement-mix application equipment; (5) includes commercially available, low cost raw materials; and (6) is generally storage stable (preferably, having a useful shelf-life of at least 6 months, more preferably, at least one year, and most preferably, at least two years). As used herein, a volatile organic component (VOC) is an organic compound with a vapor pressure of more than 0.01 mm Hg (13.33 Pascals) at 20° C. Such compounds typically have a boiling point of greater than 250° C.

The pavement marking compositions of the present invention comprise a binder comprising urea groups (—NR—C(O)—NR—), although other groups may also be present, such as biuret groups (—NR—C(O)—NR-C(O)—NR—), isocyanurate groups

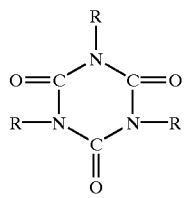

as well as urethane groups (—NR—C(O)—O—), and the like, where R is a hydrogen or an organic group. Such polymers containing urea groups are often referred to herein as polyureas. Polyureas formulated for pavement marking applications should be resistant to abrasion and provide adhesion to road surfaces and reflective elements.

The binder system is the reaction product of an amine with an isocyanate to form a urea linkage. Preferably, the binder system is the reaction of a polyaspartic ester amine, which is preferably difunctional, with a polyisocyanate to form a polyurea.

Preferred aspartic ester amines have the following formula

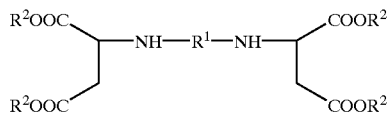

wherein $R^1$ is a divalent organic group (preferably, having 1–40 carbon atoms), and each $R^2$ is independently an organic group inert toward isocyanate groups at temperatures of 100° C. or less.

In the above formula, preferably, $R^1$ is an aliphatic group (preferably, having 1–40 carbon atoms), which can be branched, unbranched, or cyclic, and more preferably, $R^1$ is selected from the group of divalent hydrocarbon groups obtained by the removal of the amino groups from 1,4-diaminobutane, 1,6-diaminohexane, 2,2,4- and 2,4,4-trimethyl-1,6-diaminohexane, 1-amino-3,3,5-trimethyl-5-aminomethyl-cyclohexane, 4,4'-diamino-dicyclohexyl methane or 3,3-dimethyl-4,4'-diamino-dicyclohexyl methane. Divalent hydrocarbon groups obtained by the removal of the amino groups from relatively high molecular weight polyether polyamines containing aliphatically bound primary amino groups, such as the products marketed under the trade designations "JEFFAMINE" by Texaco and Huntsman, and "HYCAR" by B.F. Goodrich, are also suitable. Other suitable polyamine precursors include ethylene diamine, 1,2-diaminopropane, 2,5-diamino-2,5-dimethylhexane, 1,11-diaminoundecane, 1,12-diaminododecane, 2,4- and/or 2,6-hexahydrotoluylene diamine, and 2,4'-diamino-dicyclohexyl methane. Aromatic polyamines such as 2,4- and/or 2,6-diaminotoluene and 2,4'- and/or 4,4'-diaminodiphenyl methane are also suitable but less preferred.

In the above formula, preferably, each $R^2$ is independently an organic group having 1–40 carbon atoms, more preferably, each $R^2$ is independently an alkyl group (preferably, having 1–20 carbons), which may be branched or unbranched, and most preferably, each $R^2$ is independently a lower alkyl group (having 1–4 carbon atoms).

Suitable aspartic ester amines are commercially available from Bayer (Pittsburgh, Pa.) under the trade designations "DESMOPHEN" XP-7053, XP-7059, and XP-7109, for example.

"DESMOPHEN" XP-7053 is substantially composed of the following compound:

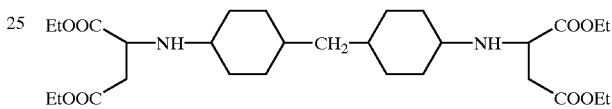

"DESMOPHEN" XP-7059 is substantially composed of the following compound:

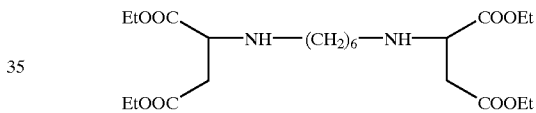

"DESMOPHEN" XP-7109 is substantially composed of the following compound:

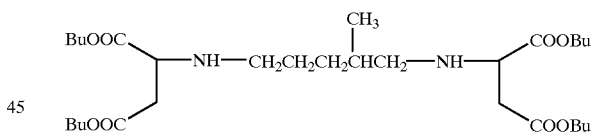

For particularly advantageous results, one or more amine-functional coreactants can be used in addition to the aspartic ester amines. These amines (other than aspartic ester amines) typically function as chain extenders and/or impact modifiers. The use of such an amine-functional coreactant can contribute to the presence of soft segments in the polymer backbone for improved toughness properties. They can be primary amines, secondary amines, or combinations thereof. Preferably, they are secondary amines, a blend of secondary amines, or a blend of secondary amines and primary amines. Some primary amines tend to react so rapidly that they are useful only in small quantities or in combination with a very slowly reacting isocyanate, such as m-tetramethylxylene diisocyanate (TMXDI). In some instances, a significant amount of primary amines can be used, and the overall coating cure rate can be moderated or slowed down with the use of a slower aspartic ester amine, such as, for example, "DESMOPHEN" XP-7053. Most preferably, the amine-functional coreactant comprises a secondary amine.

The amine-functional coreactant is preferably an amine-terminated polymer. Examples of such polymers include, but are not limited to, those available from Huntsman Chemical, under the trade designation "JEFFAMINE" polypropylene glycol diamines such as "JEFFAMINE" D-2000, those available from B.F. Goodrich, Cleveland, Ohio, under the trade designation "HYCAR" ATBN (amine-terminated acylonitrile butadiene copolymers), and those disclosed in U.S. Pat. No. 3,436,359 (Hubin et al.) and U.S. Pat. No. 4,833,213 (Leir et al.) (amine-terminated polyethers, and especially polytetrahydrofuran diamines).

A wide variety of polyisocyanates may be utilized in preparing the binder of the present invention. "Polyisocyanate" means any organic compound that has two or more reactive isocyanate (—NCO) groups in a single molecule. Particularly useful polyisocyanates can be aliphatic, alicyclic, or a combination thereof. This definition includes diisocyanates, triisocyanates, tetraisocyanates, etc., and mixtures thereof. Most preferably, aliphatic isocyanates, including cycloaliphatic isocyanates, are used to improve weathering and diminish yellowing.

Useful polyisocyanates include, but are not limited to, those selected from the group consisting of bis(4-isocyanatocyclohexyl)methane ($H_{12}$MDI, available from Bayer Corp., Pittsburgh, Pa.), diphenylmethane diisocyanate (MDI, available from Bayer Corp., Pittsburgh, Pa.), isophorone diisocyanate (IPDI, available from Huels America, Piscataway, N.J.), toluene 2,4-diisocyanate (TDI, available from Aldrich Chemical Co., Milwaukee, Wis.), hexamethylene diisocyanate (HDI, available from Aldrich Chemical Co., Milwaukee, Wis.), m-tetramethylxylene diisocyanate (TMXDI, available from Aldrich Chemical Co., Milwaukee, Wis.), and 1,3-phenylene diisocyanate. Mixtures of polyisocyanates can also be used. Furthermore, while monomeric isocyanates could be useful, they are not preferred, but could be used to make adducts and prepolymers that would be preferred.

Preferred polyisocyanates include derivatives of the above-listed monomeric polyisocyanates. These derivatives include, but are not limited to, polyisocyanates containing biuret groups, such as the biuret adduct of hexamethylene diisocyanate (HDI) available from Bayer Corp., Pittsburgh, Pa. under the trade designation "DESMODUR" N-100, polyisocyanates containing isocyanurate groups, such as that available from Bayer Corp., Pittsburgh, Pa. under the trade designation "DESMODUR" N-3300, as well as polyisocyanates containing urethane groups, uretdione groups, carbodiimide groups, allophonate groups, and the like. These derivatives are preferred as they are polymeric and have very low vapor pressures and negligible free isocyanate monomer.

There are many useful commercially available adducts of the monomeric isocyanates. There are also many useful adducts and prepolymers that are not presently commercially available that could be prepared, such as for example, the reaction products of the above mentioned aspartic ester amines with diisocyanates such as IPDI, TMXDI, and the like.

The stoichiometry of the polyurea reaction is based on a ratio of equivalents of isocyanate to equivalents of aspartic ester amine and optional amine coreactant. Preferably, the isocyanate is used in an excess. More preferably, the isocyanate:amine ratio is less than about 1.15:1. Even more preferably, the isocyanate:amine ratio is less than about 1.1:1. Most preferably, the isocyanate:amine ratio is less than about 1.05:1. The lower ratios of isocyanate to amine can potentially lead to the formation of a looser polymer network and increased viscoelastic damping in the cured coating.

To achieve desired stoichiometries, the amine and isocyanate components are combined in a volume ratio of preferably about 1:1 to about 5:1 amine to isocyanate components. More preferably, the ratio is within a range of about 1:1 to 3:1 amine to isocyanate components. Particularly preferred ratios are 2:1 and 3:1 amine to isocyanate components.

The pavement marking compositions of the present invention are referred to as two-part systems, containing one or more aspartic ester amines, optionally blended with one or more amine-functional coreactants (other than an aspartic ester amine), and one or more polyisocyanates as the two component reactive system. Additional components such as various additives can be used to achieve desirable results. For example, weathering additives such as UV absorbers, hindered amine light stabilizers, antioxidants, dispersing and grinding aids, wetting agents, impact modifiers (e.g., rubber tougheners such as those available under the trade designations "PARALOID" 2691 and EXL-2330 from Rohm and Haas), defoamers, suspension stabilizers, biocides, etc., can be added to the binder to improve the manufacturability and the overall durability of markings of the present invention. Significantly, however, no catalysts are needed to achieve desirable track-free times.

Also, pigments (e.g., $TiO_2$), fillers (e.g., talc, $CaCO_3$, clay, ceramic microspheres, hollow polymeric microspheres, and hollow glass microspheres), extenders, diluents, plasticizers, leveling agents, and surfactants can be used. Pigments impart desired visual appearance properties in the daytime and contribute to reflective performance of the marking at night. Fillers and extenders can be used to modify flow properties of the liquid coating and contribute to the bulk volume of the final coating with lower cost per volume materials. Fillers, such as ceramic microspheres, hollow polymeric microspheres (such as those available under the trade designation EXPANCEL 551 DE from Akzo Nobel, Duluth, Ga.), and hollow glass microspheres (such as those available under the trade designation K37 from Minnesota Mining and Manufacturing Co., St Paul, Minn.), are particularly useful and may also be added to achieve a specific volume ratio for the two components of this two-part coating without significantly affecting the reactive chemistry of the coating mixture. The pigments, fillers, and extenders can have a significant impact on uncured formulation and cured film density, film cure profile and track-free time, cured film modulus, coating adhesion to a substrate, response to thermal cycling, possible shrinkage of polymer components, abrasion, and coating durability. Typically at least about 15 weight percent of the final dried coating is made up of such non-soluble material, more preferably, at least about 20 weight percent and, most preferably, at least about 25 weight percent. In some instances, about 30 weight percent to about 42 weight percent of pigments, fillers, and extenders can be used.

A particularly preferred type of filler is hollow glass microspheres. Hollow glass microspheres are particularly advantageous because they demonstrate excellent thermal stability and a minimal impact on dispersion viscosity and density. They also are rapidly and easily dispersed with low shear mixing and demonstrate relatively little equipment abrasion. Preferably, the microspheres are incorporated into the amine component for enhanced storage stability. Field trials have shown that incorporation of at least about 30 volume percent, and preferably about 30 volume percent to about 40 volume percent of hollow glass microspheres into pavement marking compositions of the present invention result in improved durability of the pavement marking.

The pavement marking compositions of the present invention are typically applied directly to a traffic bearing surface with or without a primer layer or to a substrate that is applied to the surface. This can be done using spray coating techniques. Typically, the amine component and the isocyanate component are applied using a spraying apparatus that allows the components to combine immediately prior to exiting the apparatus. For example, two-component, high pressure, airless, impingement mixing systems can be used. Also, plural component spray equipment with a static mixer can be used.

An example of an airless, impingement mixing spray system is manufactured by Gusmer (1 Gusmer Drive, Lakewood, N.J. 08701-0110). The system will include the following components: a proportioning section which meters the two components and increases the pressure to above about 1500 psi (10.34 MPa); a heating section to raise the temperatures of the two components (preferably, independently) to control viscosity; and an impingement spray gun which combines the two components and allows mixing just prior to atomization. Other manufacturers of impingement systems include Binks Manufacturing (Chicago, Ill.) and Glas-Craft (Indianapolis, Ind.).

Another system useful for applying polyurea coatings is a system which uses a static mix tube to achieve blending of the two components. The system is similar to that of the impingement unit in that it meters, builds pressure, and heats the components. However, at the spray gun, the components are combined and pumped through a length of tubing which contains elements designed to mix the components prior to atomizing. This system requires periodic flushing of the static mix tube to prevent accumulation of cured polyurea which could plug the spray gun. An example of such a spray gun is a Binks Model 43P.

Viscosity behavior of the each of the two components is important for two part spray coating processes. With impingement mixing, the two parts should be as close as possible in viscosity at high shear rates to allow adequate mixing and even cure. The plural component static mix/spray system appears to be more forgiving of viscosity differences between the two components. Characterization of viscosities as functions of shear rate and temperature can help with decisions as to starting point for temperatures and pressures of the coatings in the two part spray equipment lines.

The liquid pavement marking compositions of the present invention provide polyurea coatings having conventional daytime visibility. They can also function as binders to anchor reflective optical elements. Generally, the reflective elements do not exceed about several millimeters in diameter. When the reflective elements are glass or ceramic microspheres, they are typically in the range of about 200 micrometers to about 600 micrometers.

The reflective elements can be in the form of glass beads (also referred to as microspheres or microsphere lenses) that are preferably light transmissible. Chemical treatment of bead surfaces, such as with an organochromium compound, may be utilized as known in the art to enhance resin to glass adhesion. Other chemical coupling agents such as silanes, titanates and zirconates are also known. Additionally, fluorocarbon treatment of the glass beads can aid in achieving substantially uniform hemispherical bead sinkage.

Post-spray applied elements in the form of glass or ceramic beads or microspheres can also be used as a binder filler in addition to providing night time reflectivity. They may function similarly to mineral particulates on the wear surface of a coated abrasive (sandpaper), protecting the polymeric binder from applied stresses. The microsphere average diameter, application or coverage rate (weight per unit area) and surface chemistry (e.g., treatment with coupling agent) affect the durability of pavement markings. Preferably, typical coverage rates correspond to greater than about 4 pounds of glass beads per gallon (479 grams/liter) of binder, more preferably, greater than about 10 pounds per gallon (1200 grams/liter). This corresponds to, preferably, greater than about 6 grams glass beads per 300 $cm^2$ area, for a 15 mil (0.4 mm) thick cured film, more preferably greater than about 15 grams of glass beads per 300 $cm^2$ area for a 0.4 mm thick cured film.

The reflective elements can also be in the form of ceramic microspheres (i.e., beads). "Ceramic" is used herein to refer to inorganic materials which can be either crystalline (a material having a patterned atomic structure sufficient to produce a characteristic x-ray diffraction pattern) or amorphous (a material having no long range order in its atomic structure evidenced by the lack of a characteristic x-ray diffraction pattern). Amorphous ceramics are more commonly known as glasses. Ceramic beads are preferred as they are more durable and more resistant to wear than are glass microspheres. Prior to the present invention, ceramic beads have not been practical to use in painted pavement markings because the binder has not been sufficiently durable and adherent to roads.

The ceramic beads or other reflective microspheres can be applied directly to the binder coated on the pavement surface. Alternatively, they can be applied in the form of retroreflective optical elements having vertical surfaces. Vertical surfaces provide better orientation for retroreflection. Also, they may prevent the build-up of a layer of water over the retroreflective surface during rainy weather, which otherwise interferes with the retroreflection mechanism.

One type of such retroreflective optical elements with vertical surfaces is made up of pellets comprising a thermoplastic core coated with ceramic beads. Such reflective elements and methods of making them are disclosed in the published International Publication No. WO 97/03814 (Bescup, et al.). Layered elements have been made using polymers having differing melt behavior. The retroreflective elements include a plurality of optical elements, such as glass or ceramic microspheres, partially embedded in the vertical surfaces of the reflective element core's central layer. Such reflective elements and methods of making them are disclosed in International Publication No. WO 97/28471.

All-ceramic retroreflective elements can be made, which may be used in pavement markings, with greatly improved resistance to wear and the effects of weathering. These retroreflective elements are preferably free of metals and polymeric material. These retroreflective elements are comprised of an opacified ceramic core and ceramic optical elements partially embedded into the core. The opacified ceramic cores of these composite reflective optical elements will often contain a mixture of amorphous (glass) and crystalline phases. The retroreflective element may be irregular in shape or in the form of a sphere, disc, tile, etc. The diffuse reflecting ceramic core, in combination with the transparent optical elements embedded in the surface, provides a surprisingly bright retroreflective element without the gray coloration and the susceptibility to corrosion associated with metallic specular reflectors. Such reflective elements and methods of making them are disclosed in U.S. patent application Ser. No. 08/591,570.

Many other variations of composite retroreflective elements or aggregates are known which have a polymeric core with optical elements embedded in the core surface. See, for example, U.S. Pat. Nos. 3,252,376; 3,254,563; 4,983,458; 4,072,403; 4,652,172; and 5,268,789. Other retroreflective elements can also be constructed having a ceramic core and glass optical elements with a metallic specular coating. See, for example, U.S. Pat. Nos. 3,043,196; 3,175,935; 3,556,637; 3,274,888; and 3,486,952; and EP Publication No. 0,322,671. Ceramic retroreflective elements typically exhibit greater resistance to weathering and to wear. Some known embodiments also contain optical elements dispersed throughout the core. The core may be irregular in shape or may be regularly shaped e.g., spheres, tetrahedrons, discs, square tiles, etc. Retroreflective elements are advantageous because they can be embedded into inexpensive painted markings.

Whatever the type of reflective element, they can be flood coated onto the entire surface of the binder painted on the pavement surface; however, this can be quite expensive for ceramic microspheres. Alternatively, the reflective elements can be positioned only in the most efficient optical part of the surface. Control of element placement on liquid markings is important for obtaining durable high retroreflectivity. They can also be included within one of the components prior to mixing and applied, for example, during the spray coating of the two-component liquid.

Also, it is important to understand the mechanism of embedment of elements, whether in the form of coated pellets or microspheres. Surface treatments can be used to obtain appropriate sinkage, not too deep or not too shallow, and control wetting and capillation of the coating up the sides of the element. Also, the cure rheology of the two-part binder system can affect the ability to sink elements.

The following examples are offered to further illustrate the various specific and preferred embodiments and techniques. It should be understood, however, that many variations and modifications may be made while remaining within the scope of the present invention. For example, the particular materials and amounts thereof recited in these examples, as well as other conditions and details, are to be interpreted to apply broadly in the art and should not be construed to unduly limit the invention.

EXAMPLES

The following procedure is a typical one useful for preparing the amine component of two-part compositions of the invention.

Pigment Dispersion Procedure

Step 1: In the appropriate size mixing vessel, charge one half or less by wt of the amine component (preferably the most viscous), and the dispersant, if used. Mix at low shear (500–1000 rpm) for 1 minute to blend. Add $TiO_2$ pigment, if used, in two portions. Mix with Cowles-type impeller blade, at low shear (500–1000 rpm) for several minutes, until uniform consistency.

Step 2: Add additional extenders (those which are not shear-sensitive) to the mixing vessel in several portions, followed by mixing to avoid clump formation.

Step 3: Once all nonshear-sensitive extenders are added, mix at high shear to disperse agglomerated pigment and extenders. This typically requires use of the appropriate size Cowles-type blade (e.g. 4 inch (10.2 cm) diameter for use in 5 gallon (19 liter) pail), at 2,000–3,000 revolutions per minute (rpm), over the course of 20–60 minutes or more. The optimum rpm depends on batch size, viscosity and component types. Additional amine/liquid component can be added as required to maintain a viscosity that is appropriate for grinding.

The batch temperature will increase to 120° F. to 140° F. (49° C. to 60° C.). A Hegman-type grind gauge is used to monitor dispersion progress. A grind to a particle size of less than one mil was typically achieved, which corresponds to a 7.0 on the PC grind scale.

Step 4: Remaining amine and other liquids are added at this time, with low shear mixing.

Step 5: Shear sensitive extenders, such as the hollow glass or polymeric microspheres are added in portions as required to prevent clumping, and dispersed with a low shear blade, such as a propeller or jiffy-style mixer, and rpms of 500 or less, for 10–15 minutes.

The following materials were used to prepare examples of the present invention.

| Ingredient | Description | Supplier | Location |
|---|---|---|---|
| Amine Component | | | |
| "DESMOPHEN" XP-7109 | aspartic ester diamine | Bayer Corp. | Pittsburgh, PA |
| "DESMOPHEN" XP-7059 | aspartic ester diamine | Bayer Corp. | Pittsburgh, PA |
| "DESMOPHEN" XP-7053 | aspartic ester diamine | Bayer Corp. | Pittsburgh, PA |
| "AEROSIL" A-200 silica | fumed silca | Degussa Corp. | Ridgefield Park, NJ |
| "AEROSIL" R-972 silica | fumed silca | Degussa Corp. | Ridgefield Park, NJ |
| "Ti-PURE" R 706 TiO2 | titanium dioxide | Dupont Company | Wilmington, DE |
| "Ti-PURE" R 960 TiO2 | titanium dioxide | Dupont Company | Wilmington, DE |
| "OMYACARB" 6 calcium carbonate | calcium carbonate | Omya Inc. | Proctor, VT |
| "NICRON" 402 talc | talc | Luzenac America, Inc. | Englewood, NJ |
| 3M "SCOTHLITE" K37 glass bubbles | glass microspheres | Minnesota Mining and Manufacturing Co. | St. Paul, MN |
| "DISPERBYK" 110 dispersant | dispersant additive | Byk-Chemie USA | Wallingford, CT |
| "JEFFAMINE" D-2000 diamine | polyoxypropylene-diamine | Huntsman Corp. | Austin, TX |
| "HYCAR" 1300X45 diamine | amine terminated liquid copolymer | BF Goodrich Specialty Chemicals | Cleveland, OH |

-continued

| Ingredient | Description | Supplier | Location |
|---|---|---|---|
| "EXPANCEL" 551 DE microsphere | polymeric microsphere | Akzo Nobel | Duluth, GA |
| Isocyanate component | | | |
| "DESMODUR" N-100 | polyisocyanate | Bayer Corp. | Pittsburgh, PA |
| "DESMODUR" N-3300 | polyisocyanate | Bayer Corp. | Pittsburgh, PA |

The following examples were prepared.

| | Parts by Weight (Weight Fraction) Example | | | | | | | | | | | |
|---|---|---|---|---|---|---|---|---|---|---|---|---|
| Ingredient | 1 | 2 | 3 | 4 | 5 | 6 | 7 | 8 | 9 | 10 | 11 | 12 |
| Amine Component | | | | | | | | | | | | |
| "DESMOPHEN" XP-7109 | | 34.48 | | 14.06 | | | | | 12.97 | 11.65 | | |
| "DESMOPHEN" XP-7059 | | | 36.02 | 11.34 | 17.35 | 17.44 | 17.29 | 15.76 | 10.47 | 9.4 | 16.41 | |
| "DESMOPHEN" XP-7053 | 37.08 | | | 13.66 | 20.90 | 21.01 | 20.82 | 19.12 | 12.61 | 11.33 | 19.76 | 37.66 |
| "AEROSIL" A-200 silica | | 1.38 | | | | | | | | | | |
| "AEROSIL" R-972 silica | | | 0.18 | 0.78 | | | | 0.17 | 0.87 | 0.39 | 0.18 | |
| "Ti-PURE" R 706 TiO2 | | 5.87 | 10.11 | 10.31 | | | | | | | | 6.55 |
| "Ti-PURE" R 960 TiO2 | 37.08 | | | | 10.28 | 10.33 | 10.24 | 9.4 | 10.82 | 9.72 | 11.01 | |
| "OMYACARB" 6 calcium carbonate | | 24.83 | | | | | | | | | | 27.11 |
| "NICRON" 402 talc | | | 18.01 | 18.36 | 18.30 | 6.89 | 6.83 | 15.67 | 16.20 | 17.3 | 14.69 | |
| 3M "SCOTHLITE" K37 glass bubbles | | 6.39 | 4.28 | 1.82 | 2.91 | 13.91 | 13.81 | 11.21 | | 7.82 | 0.69 | |
| "DISPERBYK" 110 dispersant | | | | | | | | 0.86 | | | | |
| "JEFFAMINE" D-2000 diamine | | | | | | | | | 7.21 | 6.48 | | |
| "HYCAR" 1300X45 diamine | | | | | | | | | | | 7.23 | |
| "EXPANCEL" 551 DE microsphere | | | | | | | | | | | | 0.84 |
| Isocyanate component | | | | | | | | | | | | |
| "DESMODUR" N-100 | | 27.06 | 31.4 | 29.67 | 30.26 | 30.42 | | | 28.86 | 25.92 | | |
| "DESMODUR" N-3300 | 25.84 | | | | | | 31.01 | 27.81 | | | 30.02 | 27.84 |
| Isocyanate:amine stoichiometric ratio | 0.99:1.0 | 1.17 | 1.05 | 1.05 | 1.05 | 1.05 | 1.05 | 1.05 | 1.05 | 1.05 | 1.05 | 1.05 |
| amine:isocyanate volume ratio | 2.0:1.0 | 2.69:1.0 | 2.0:1.0 | 2.0:1.0 | 2.0:1.0 | 3.0:1.0 | 3.0:1.0 | 3.0:1.0 | 2.0:1.0 | 3.0:1.0 | 2.0:1.0 | 2.80:1.0 |
| approximate track-free time (min) without aid of detackification by glass beads | 12 | 2 | 2 | 3 | 4 | 4 | 4 | 4 | 3 | 3 | 3 | 12 |
| volume percent hollow microspheres | 0 | 27 | 15 | 7 | 10 | 37 | 37 | 31 | 0 | 24 | 2 | 22 |

Coatings were prepared from Example 1 by charging the pigmented amine component to one chamber and the isocyanate component to the other chamber of a dual chamber syringe, injecting the two components simultaneously through a static mixing tube to mix the amine and isocyanate components, and using a doctor blade to coat the reactive mixture onto metal and glass test panels. Coatings were also applied to paper release liners and allowed to cure. The targeted thickness was 0.38 mm.

Coatings were prepared from large batches (i.e., 20 liters) of Examples 2 through 10 by charging the filled amine and isocyanate components to the separate reservoir chambers of an Airtech two component spraying system and spraying the coating through a Binks 43P static mix spray gun onto a pavement surface. Coatings were also spray applied to metal test panels and paper release liners and allowed to cure. The target thickness was 0.38 mm.

Coatings were prepared from Examples 11 and 12 by mixing the amine components as specified in the pigment dispersion procedure. The specified amount of the amine and isocyanate components were added to a mixing vessel and blended with low shear mixing. Using a doctor blade, the reactive mixture was coated onto paper release liners, metal or glass test panels. The target thickness was 0.38 mm.

For all samples, the cure profile was monitored at 30 second intervals, by drawing a tongue depressor across the sample, and by assessing finger tack. Track-free time was defined as that time where the cure had progressed to the point where the material no longer flowed, and had formed a coherent film.

Testing

The following data is useful to characterize the performance, cure profiles and durability of coatings of the invention: dry time or track-free time (minutes), abrasion loss (grams), and retroreflectivity ($mcd/m^2/lx$) performance of markings having the retroreflective optical elements.

Abrasion resistance of the coatings can be measured using a Taber Abraser. Samples of Example 7 coated on aluminum test panels were weighed and then abraded for 2000 cycles with a 500 g load using a CS-17 abrader wheel at ambient laboratory conditions. Wear debris was wiped from the samples after abrasion and the samples were weighed again.

Average weight loss in grams was 0.0472 compared to a loss of 0.112 grams for a commercially available water-based traffic paint.

Pavements markings of the type disclosed in this invention are used to define lanes and therefore applied as continuous lines on the edge of a lane or in dashed lines separating lanes, referred to as skips. These markings are referred to as longitundinal markings in that they run parallel to the direction of travel. In actual use a relatively small percent of vehicles using the road will actually traverse these markings.

In order to study the wear properties of a traffic marking it is common to apply the material to a road surface in a transverse pattern, that is, applied across the lanes and perpendicular to the direction of travel. In that way each vehicle will hit some portion of the test line. The wear pattern that is created may be further described as "wheel track" or the portion of the line directly in the path of the vehicle tire that receives the highest wear, or "edge line", the area nearer the boundary of the lane that is less frequently hit. By an analysis of the performance of a test marking applied in this manner it is possible to study the wear properties of a marking in an accelerated time frame to provide an estimate of actual durability.

A test of this type was installed comparing the performance of the subject marking to two commercially available pavement marking products. These were chosen as controls or reference materials as they are known to provide excellent durability and more than 2 years of service life as longitudinal markings. The data reported is reflectivity measured according to ASTM E 1710-95a and taken in the wheel track, or the area of highest wear. As can be seen from the table the subject material compared quite favorably with the commercial products in spite of the lower coating thickness.

| Material Identification | Coating thickness (mm) | Reflectivity in mcd/m2/1x | | | |
|---|---|---|---|---|---|
| | | Initial | 1 month | 4 month | 7 month |
| 3M type A340 Tape | 1.02 mm | 530 | 448 | 248 | 162 |
| Patterned polyester | >1 mm | 390 | X | 183* | 124 |
| Example #8 | 0.254 mm | 1050 | 472 | 177 | 344 |
| Example #8 | 0.254 mm | 1000 | 450 | 247 | 254 |
| Example #8 | 0.381 mm | 980 | 533 | 281 | 245 |

*measurement taken at 3 months

Samples 1 through 10 were applied as described above and evaluated. The highest durability (defined as retained anchorage to the substrates) was obtained using those formulations containing a high loading of hollow glass bubbles/microspheres. For example, Example 6 containing 37 volume percent glass bubbles performed better than Example 5, which is based on the same coreactants, but contains only 10 volume percent glass bubbles. Also, Example 10, containing 24 volume percent glass bubbles, exhibits better durability when compared to Example 9, which incorporates identical coreactants, but contains no glass bubbles. Furthermore, the "JEFFAMINE" coreactant in Examples 9 and 10, and the "HYCAR" amine terminated copolymer both increased the flexibility and tear resistance of the coatings generated. Also, amine selection can impact coating durability. Example 8 exhibits better durability compared to Example 2. In this instance, the higher modulus film formed in Example 8, using the stiffer XP-7053 and XP-7059 aspartic ester amine components, is found to impart improved durability performance, when compared to Example 2, which is based on the more flexible XP-7109 amine. The addition of the dispersant in Example 8 lowers viscosity and improves shelf stability of the filled amine component.

In actual use, markings based on Examples 2 and 8 have been applied at −8 C. and the coating was found to cure with track free times of less than 5 minutes.

All patents, patent documents, and publications cited herein are incorporated by reference as if individually incorporated. The foregoing detailed description has been given for clarity of understanding only. No unnecessary limitations are to be understood therefrom. The invention is not limited to the exact details shown and described, for variations obvious to one skilled in the art will be included within the invention defined by the claims.

What is claimed is:

1. A pavement marking comprising:
   a binder having polyurea groups, wherein the binder is prepared from a coating composition comprising:
   one or more aliphatic secondary amines;
   one or more polyisocyanates;
   material selected from the group consisting of fillers, extenders, pigments, and combinations thereof; and
   reflective elements;
   wherein the coating composition has a minimum application temperature of at least about 7° C.

2. A pavement marking comprising:
   a binder having polyurea groups, wherein the binder is prepared from a coating composition comprising:
   one or more aliphatic secondary amines;
   one or more polyisocyanates;
   material selected from the group consisting of fillers, extenders, pigments, and combinations thereof; and
   reflective elements;
   wherein the coating composition has a track-free time of no greater than about 5 minutes.

3. A pavement marking comprising:
   a binder having polyurea groups, wherein the binder is prepared from a coating composition comprising:
   one or more aliphatic secondary amines;
   one or more polyisocyanates;
   material selected from the group consisting of fillers, extenders, pigments, and combinations thereof; and
   reflective elements;
   wherein the pavement marking has an open time of at least 30 seconds and a retained reflectivity of at least 100 mcd/m$^2$/lux after at least 2 years in use as longitudinal traffic markings as measured according to ASTM E 1710-95.

4. A pavement marking comprising:
   a binder having polyurea groups, wherein the binder is prepared from a coating composition comprising:
   one or more aliphatic secondary amines;
   one or more polyisocyanates;
   material selected from the group consisting of fillers, extenders, pigments, and combinations thereof; and
   reflective elements;
   wherein the coating has an open time of at least 30 seconds and a minimum application temperature of at least about 7° C.

5. A pavement marking comprising:
   a binder having polyurea groups, wherein the binder is prepared from a coating composition comprising:
   one or more aliphatic secondary amines;
   one or more polyisocyanates;
   material selected from the group consisting of fillers, extenders, pigments, and combinations thereof; and
   reflective elements;
   wherein the coating has an open time of at least 30 seconds and a track-free time of no greater than about 5 minutes.

6. A pavement marking comprising:
a binder having polyurea groups, wherein the binder is prepared from a coating composition comprising:
one or more aliphatic secondary amines;
one or more polyisocyanates;
material selected from the group consisting of fillers, extenders, pigments, and combinations thereof; and
reflective elements;
wherein the coating has a minimum application temperature of at least about 7° C. and a retained reflectivity of at least 100 mcd/m$^2$/lux after at least 2 years in use as longitudinal traffic markings as measured according to ASTM E 1710-95.

7. A pavement marking comprising:
a binder having polyurea groups, wherein the binder is prepared from a coating composition comprising:
one or more aliphatic secondary amines;
one or more polyisocyanates;
material selected from the group consisting of fillers, extenders, pigments, and combinations thereof; and
reflective elements;
wherein the coating has a track-free time of no greater than about 5 minutes and a retained reflectivity of at least 100 mcd/m$^2$/lux after at least 2 years in use as longitudinal traffic markings as measured according to ASTM E 1710-95.

8. A pavement marking comprising:
a binder having polyurea groups, wherein the binder is prepared from a coating composition comprising:
one or more aliphatic secondary amines comprising an aspartic ester amine;
one or more polyisocyanates;
material selected from the group consisting of fillers, extenders, pigments, and combinations thereof; and
reflective elements;
wherein a retained reflectivity of at least 100 mcd/m$^2$/lux after at least 2 years in use as longitudinal traffic markings as measured according to ASTM E 1710-95.

9. A pavement marking comprising:
a binder having polyurea groups, wherein the binder is prepared from a coating composition comprising
one or more aliphatic secondary amines comprising an aspartic ester amine;
one or more polyisocyanates;
material selected from the group consisting of fillers, extenders, pigments, and combinations thereof; and
reflective elements;
wherein the coating has a minimum application temperature of at least about 7° C.

10. A pavement marking comprising:
a binder having polyurea groups, wherein the binder is prepared from a coating composition comprising
one or more aliphatic secondary amines comprising an aspartic ester amine;
one or more polyisocyanates;
material selected from the group consisting of fillers, extenders, pigments, and combinations thereof; and
reflective elements;
wherein the coating has a track-free time of no greater than about 5 minutes.

* * * * *